March 26, 1963

J. E. MacDONALD, JR 3,082,844

LUBRICATION SYSTEMS FOR PRESSURE-OPERATED HOSE-FED
PILE-DRIVING HAMMERS AND THE LIKE

Filed Oct. 27, 1958

INVENTOR
JAMES E. MACDONALD, JR
BY
Curtis, Morris & Safford
ATTORNEYS

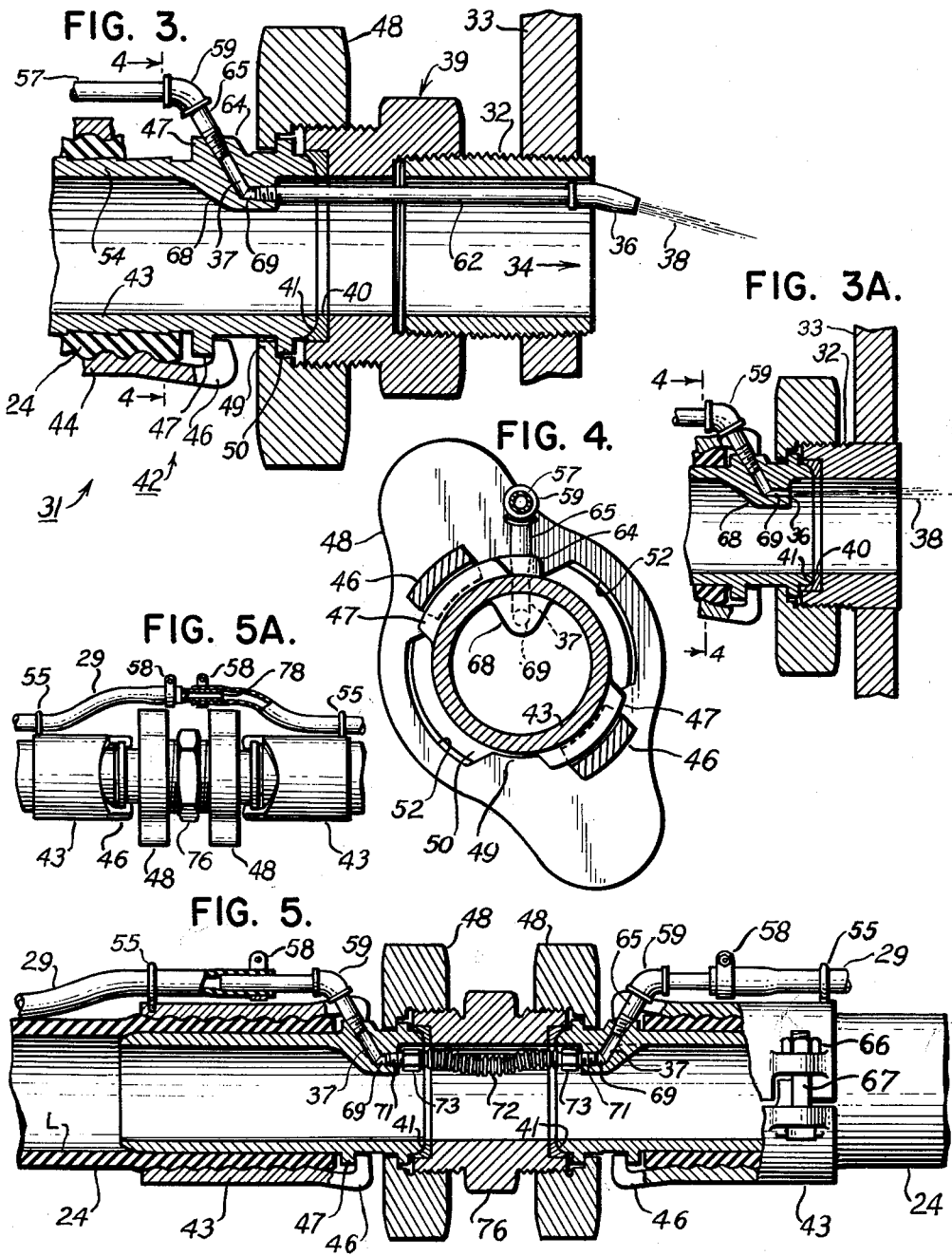

United States Patent Office 3,082,844
Patented Mar. 26, 1963

3,082,844
LUBRICATION SYSTEMS FOR PRESSURE-OPERATED HOSE-FED PILE-DRIVING HAMMERS AND THE LIKE
James E. MacDonald, Jr., 90 South-Woodland St., Englewood, N.J.
Filed Oct. 27, 1958, Ser. No. 769,800
5 Claims. (Cl. 184—7)

This invention relates to lubrication systems for pressure-operated hose-fed reciprocating hammers and the like. The lubrication systems of the present invention are particularly advantageous for use with large double-acting pile driving hammers which require large quantities of pressure fluid, such as compressed air or steam, and also require a steady, uninterrupted flow of substantial quantities of lubricating oil to moving parts.

In the systems of the present invention the pressure fluid is fed to the operating mechanism through a pressure hose, and the lubricating oil is fed through a small diameter passageway so that it does not come into contact with the interior of the pressure hose. At the pressure-operated mechanism the lubricating oil is introduced so as to provide highly effective lubricating action for the moving parts while protecting the interior of the pressure hose from contact with the oil. In the examples of the present invention described herein, the lubricating oil is injected into a pile-driving hammer through the wall of the coupling which connects the pressure hose itself to the hammer.

To increase the efficiency and speed of construction of foundations, piers, bulkheads, retaining walls, and other large structures, the construction industry has been continuing for many years toward the use of very large sizes of pile-driving hammers and of other large reciprocating hammer equipment. For example, in recent years double acting pile-driving hammers have been in use having a 5,000 pound reciprocating ram operating at a normal rate of 95 blows per minute. This type of equipment consumes a large flow of steam or compressed air and utilizes a 2½ or 3 inch diameter pressure hose operating at pressure hose operating at pressures of 125 pounds per square inch and often higher. Large compressors or boilers placed at a convenient location near the construction site feed the air or steam through the pressure hose to the pile-driving hammer.

It has been conventional practice for many years to feed lubricating oil into the pressure hose near the source of the air or steam so that the oil travels along through the hose together with the pressure fluid to the pile-driving hammer. As the lubricating oil is carried through the hose with high pressure steam, atomized oil mixed with steam attack the lining of the hose. Any sulphur present in the lubricating oil in combination with the condensed steam produces acids. Under this attack the inner casing of the hose weakens and swells. The flow of steam is choked down and reduces the efficiency of the pile hammer. Occasionally, chunks of the hose lining break loose and are carried into the pile hammer itself where they clog the ports and valves. This clogging necessitates costly shutdowns of the operation and complete disassembly of the pile hammer so as to remove the pieces of hose.

It has been my experience that the best quality of steam pressure hose lasts only about 20% to 25% of its normal life when subjected to the combined attack of steam and atomized oil. The resulting frequent replacement of the hose is troublesome and expensive.

This same problem occurs when compressed air and lubricating oil are mixed in the pressure hose, but it is not so severe as in the case of steam. Moisture condenses out of the compressed air and collects in pockets in the low portions of loops or bends in the hose. These pockets of water combine with chemicals in the lubricating oil to form acids which attack the lining of the hose.

Among the many advantages of the present invention are those resulting from the fact that it assures proper and adequate lubrication of large pressure-operated reciprocating hammers such as pile-driving hammers. The life service of pile hammer hose is greatly extended. Efficiency of the pile hammer is increased because a full flow of steam is assured. Choking off of the steam flow by swelling of the lining is eliminated.

In this specification and in the accompanying drawings, are described and shown embodiments of the lubrition system of my invention and various modifications thereof are indicated, but it is to be understood that these are given for purposes of illustration in order that others skilled in the art may fully understand the invention and the manner of applying the lubrication system in practical use on pressure-operated hose-fed reciprocating hammers and so that they may modify and adapt the lubrication system in various forms, each as may be best suited to the conditions of a particular construction project.

The various objects, aspects, and advantages of the present invention will be more fully understood from a consideration of the following specification in conjunction with the accompanying drawings, in which:

FIGURE 3 is an axial sectional view corresponding to FIGURE 2 and showing a modified form of the invention;

FIGURE 3A is a partial axial sectional view corresponding with FIGURE 3 but being shown on a somewhat reduced scale and illustrating another form of the invention;

FIGURE 4 is a cross section taken along the line 4—4 of FIGURE 3 looking toward the right; FIGURE 4 also corresponds to a section along the line 4—4 of FIGURE 3A;

FIGURE 5 is an axial sectional view shown on a reduced scale illustrating a coupling between two lengths of pressure hose including an interconnection for the oil line; and FIGURE 5A is a side elevational view corresponding to FIGURE 5 but shown on a further reduced scale illustrating a different interconnection for the oil line.

Figure 1:
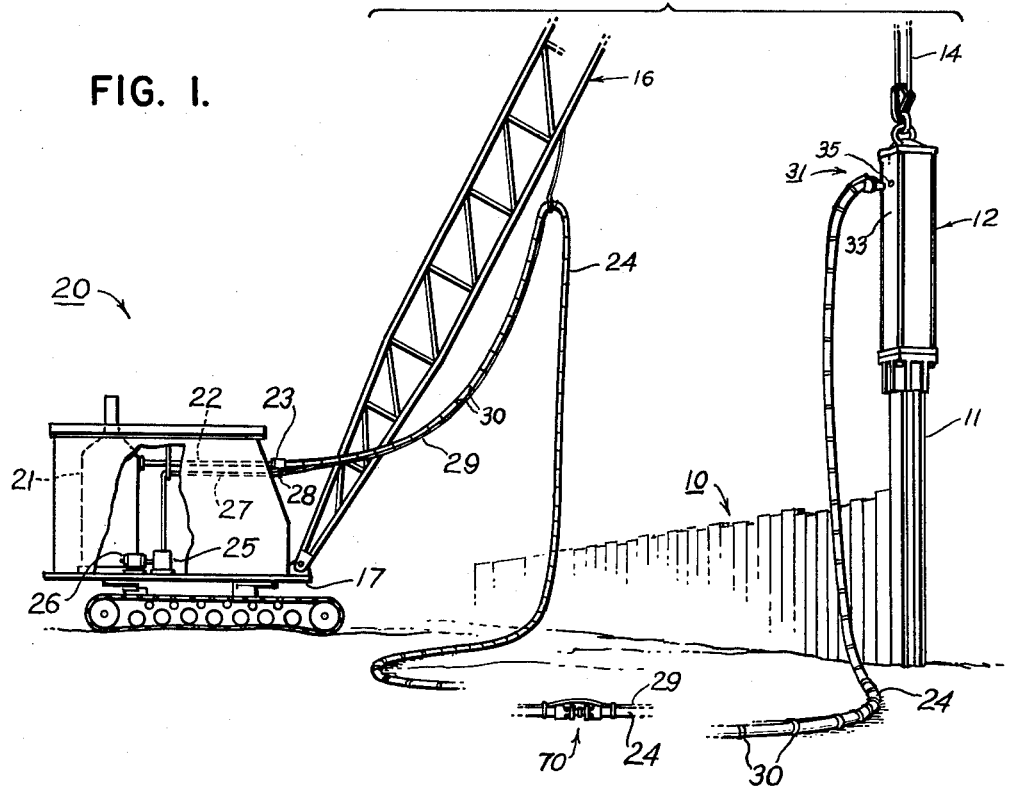
FIGURE 1 is a perspective view of an illustrative embodiment of the present invention. A steam-operated pile hammer is shown in use with the lubricating oil being fed to the hammer through a separate small diameter hose secured along the outside of the steam hose.

As shown in FIGURE 1, a bulkhead 10 is being formed by driving a row of sheet piles into the earth. The sheet pile 11 is being driven by a heavy duty double-acting pile hammer 12, which is suspended by a cable 14 from the boom 16 attached to the chassis 17 of a pile-driving rig, generally indicated at 20. For example, the hammer 12 may be a Double Acting Pile Hammer No. 11-B-3 made by the McKiernan-Terry Corporation of New York, N.Y. A boiler 21 supported on the chassis of the crane feeds steam at a pressure of at least 125 p.s.i. through a pipe 22 to a pressure control valve 23. The operator adjusts this valve so as to send the proper amount of steam through the pressure hose 24 to the pile hammer 12, thus maintaining the rated speed of the hammer.

In order to lubricate the pile hammer by supplying metered quantities of lubrication oil, for example at a rate such as 2½ gallons for each 8 hours of operation, a force feed lubricator 25 is mounted on the chassis and driven by a motor 26. A suitable lubricator 25 is available commercially from the Manzel Brothers Company of Buffalo, N.Y. under the trade designation as their Model No. 25 Lubricator. The oil under pressure is fed through a line 27 to a coupling 28 where it passes into a small diameter hose 29 which runs along the outside of the steam pressure hose 24.

This oil line hose may conveniently have an inside diameter in the range from $3/16$ to $½$ of an inch, and in this example has an inside diameter of $⅜$ of an inch which is very suitable for a pile driving system as shown here. A series of bands 30 are spaced at intervals along the length of the pressure hose 24 for securing the oil hose 29 thereto. In this example, these bands 30 are formed by straps of leather binding the oil line hose against the side of the pressure hose and spaced at 9-inch intervals.

Figure 2:
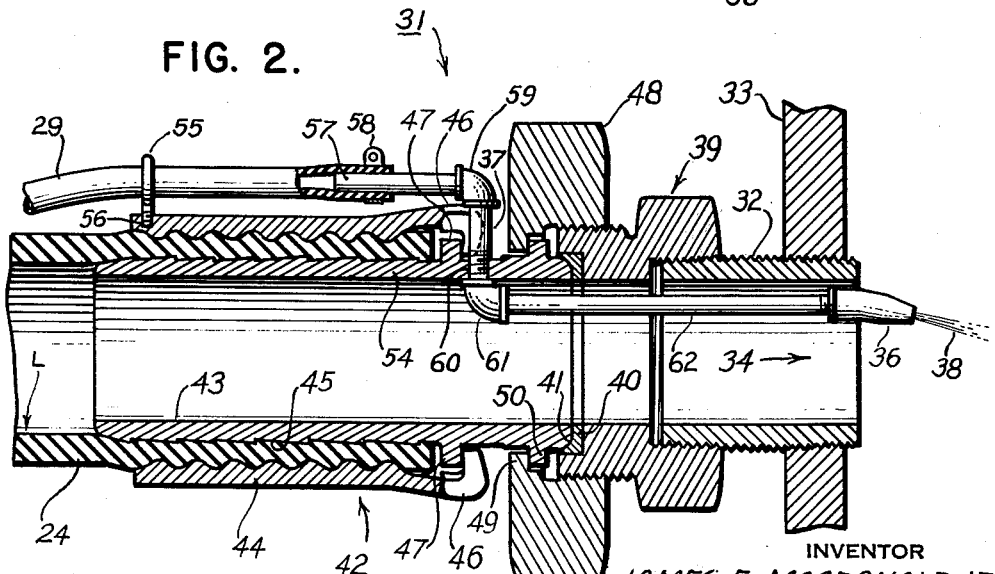
FIGURE 2 is an axial sectional view showing the end of the steam hose attached to the body of the pile hammer. The lubricating oil is introduced to the interior of the hammer through the wall of the coupling near the point of attachment to the hammer.

The pressure hose is connected by a coupling 31 as illustrated in detail in FIGURE 2 to a short threaded nipple 32 projecting from the casing 33 of the pile hammer and forming the intake port 34 for the hammer. Spent steam is exhausted through the exhaust vent 35 adjacent to the intake port.

In order to assure proper lubrication of the moving parts of the hammer 12 within the casing 33, the lubricating oil is injected through the intake port 34 by an oil injector 36, shown as a nozzle. Advantageously, the lubricating oil from the oil line hose 29 is fed to this injector 36 by a passageway 37 entering into the intake port 34 through the side wall of the coupling 31, as will be explained below in detail. The jet of lubricating oil 38 is injected directly into the path of the steam entering the intake port 34. In this way the lubricating oil 38 is directly struck by the blast of steam entering the hammer and is dispersed most effectively to all of the working parts within the hammer. Thus, a uniform effective lubrication of all parts is assured. Also, the hose coupling 31 serves the combined function of connecting the pressure hose to the hammer and also of positioning the oil injector nozzle 36 in position to supply the lubrication. This arrangement of the oil injection passageway entering through the side wall of the detachable hose coupling 31 has the advantage of enabling the efficient lubrication system described herein readily to be applied to existing pile hammers without requiring any modification of these hammers.

As shown in FIGURE 2, the hose coupling 31 which is detachable from the hammer includes first hose-connecting means 39 for making a connection to the hammer near the intake port 24 and illustratively shown here as a spud 39 screwing onto the projecting end of the threaded nipple 32. This connecting means or spud 39 includes an insert 40 of a relatively soft non-corrosive material such as copper defining one side of a detachable joint 41.

This hose coupling 31 also includes second hose-connecting means, generally indicated at 42 as being integrally attached to the end of the pressure hose and comprising a coupling stem 43 and a hose clamp 44. The coupling stem 43 is inserted into the end of the pressure hose 24 and has a corrugated outer surface 45 engaging the lining L of the pressure hose. Coupling stems of this general type but without the features of the lubrication system described herein are available commercially from the Dixon Valve and Coupling Company of Philadelphia under the trademark "Boss." Surrounding the end of the pressure hose is the clamp 44 which is illustrated as being of the four-bolt type for holding the hose securely in place on the stem 40. This type of four-bolt clamp but without the features of the lubrication system described herein, is shown in U.S. Patent No. 2,166,524 and is also available from this company under the "Boss" trademark.

In order to lock the hose clamp 44 integrally together with the coupling stem 43, a pair of opposed hooked fingers 46 project forward from the clamp 44. These fingers 46 engage over and hook onto a pair of opposed lugs 47 projecting from opposite sides of the coupling stem near the ground joint 41. This end of the coupling stem is shaped to form a rounded annular seat engaging the copper insert 40 and forming a pressure-tight seal. For detachably connecting the coupled means 39 and 42 together, a swivel nut 48 is provided with an inner shoulder 49 engaging a flange or shoulder 50 on the coupling stem near the joint 41. The inner shoulder 49 in this example has a pair of recesses therein such as are shown in FIGURE 4 at 52 to provide clearance space for the swivel nut 48 to pass over the lugs 47 when the nut is assembled with the coupling stem 43.

Instead of using a swivel nut with a segmented shoulder 49 as formed with the recesses 52, a swivel nut with a continuous or full shoulder 49 can also be used. Then the lugs 47 are in the form of a continuous flange, and the flange 50 is of larger diameter than flange 47 so as to be engaged by the continuous inner shoulder 49. It will be appreciated that either form of hose coupling is within the scope of my invention.

In order to introduce the lubricating oil most effectively into the pile hammer, the oil line hose 29 is anchored to the coupling means 42 and communicates with the interior of the coupling 31 by means of the injector passageway 37 passing through the wall 54 of the coupling stem 43. A fastening member for anchoring the oil line hose to the second hose-connecting means and for supporting the oil line hose near the coupling 31 is provided in the form of an eye bolt 55 screwed into a socket 56 in the end of the hose clamp 44 opposite to the fingers 46. The oil hose 29 passes through the eye of this anchoring member 55 and connects onto a small diameter pipe 57 where it is held by a hose clamp 58. The oil pipe 57 is connected by an elbow 59 to another small diameter pipe forming the injector passageway 37 which is screwed through a threaded opening 60 in the coupling wall 54. It will be appreciated that instead of the small diameter pipe 57 an oil line hose coupling may be used to interconnect oil line hose 29 and the injector passageway 37.

A short length of the threaded end of the injector pipe 37 projects into the interior of the coupling where the injector passageway changes direction so as to aim in the general direction of the flow of pressure fluid to the port 34. As shown, this projecting inner end of the injector pipe 37 receives another elbow 61 which connects to the injector nozzle 36 through a nozzle extension pipe 62. In this example, the nozzle 36 is shown as projecting slightly within the interior of the hammer casing 33. It will be appreciated that the location of the nozzle 36 depends upon the particular arrangement of the operating parts within the hammer. This nozzle 36 should be positioned to inject the stream of oil 38 so as to be swept along by the passage of the pressure fluid from the hose 25 through the coupling into the port 34.

The modified form of the invention shown in FIGURE 3 is similar to the example of FIGURE 2 is many respects and parts performing corresponding functions have corresponding reference numbers, the differences between these two examples being described hereinafter.

In order to provide for injection of the lubricating oil, the wall 54 of the coupling stem 43 is thickened and strengthened in the region of the injector passageway 37. As shown in FIGURES 3 and 4, one of the lugs 47 has an enlarged projection 64 at one end. This projection 64 extends circumferentially from the lug 47 as illustrated in FIGURE 4 and also extends in an axial direction toward the flange 50 as seen in FIGURE 3. The injector passageway 37 is drilled at an angle through this lug extension and is threaded at its outer end to receive a short oil pipe 65. It will be appreciated that this offset lug extension 64 enables the oil pipe 65 to clear the adjacent hook finger 46, as indicated in FIGURES 3A and 4. Moreover, this lug extension provides a lateral shoulder adjacent to the hook finger 46 which is helpful in aligning the pair of fingers 46 with the lugs 47 before the clamp nuts 66 (please see also FIGURE 5) are tightened up on the clamp bolts 67.

This example shows at least one of the recesses 52 in the swivel nut 48 as being enlarged beyond that of the typical couplings in use prior to this invention so as to span the lug 47 and the projection 64. Alternatively, when a continuous flange 47 is used, as discussed above, then the inner shoulder 49 will be continuous and of sufficient diameter to clear the flange 47 and the projection 64 behind this flange 47.

It will be understood that the projection 64 can be formed as a ridge separate from the flange or lug 47. But in most installations it is advantageous to utilize a construction as described in detail wherein the projection 64 forms an integral extension behind the lug or continuous flange 47. This integral projection 47 and 64 is convenient to fabricate by casting and forms a strong compact unit.

Within the interior of the coupling is a streamlined boss 68 and the axially inclined passageway 37 extends into the interior of this boss where it meets an axially drilled opening 69 that is threaded to hold the nozzle extension 62.

In the embodiment of FIGURE 3A the threaded nipple 32 is enlarged to have a suitable thread size for directly receiving the swivel nut 48, as will be understood. The copper insert 40 is shown in the end of this nipple 32. Advantageously, the streamlined boss 68 itself forms the injector nozzle 36. The axially directed opening 69 is slightly reduced in diameter and acts as a nozzle to aim the oil 38 along the coupling in the direction of the pressure fluid entering the port 34. By virtue of the streamlined reduction in the cross sectional area caused by the presence of the boss 68 there is a slight reduction in pressure behind the boss which aids in drawing the oil along into the port 34.

When the pile hammer is operating to sink piles on a batter, and the steam flow is being throttled down to reduce the operating rate, then the entrance to the port 34 may be inclined upwardly due to the inclination of the pile hammer itself. In such operations, to assure that the lubricating oil remains spaced away from the lining of the pressure hose 24, the boss 68 may be extended axially toward the port 34 beyond the point shown in FIGURE 3A.

More than one length of the pressure hose are often used to reach to hammer 12, the hose lengths being joined together at interconnections such as are indicated in FIGURES 1, 5 and 5A at 70. One form of this hose interconnection is shown in FIGURE 5, and utilizes hose coupling means 42 generally similar to that shown in FIGURE 3. Corresponding reference numerals are used for similar parts.

In order to join the adjacent ends of the two oil line hoses 29 the nozzle extension 62 is unscrewed from the threaded opening 69 in this connection and is replaced by a short coupling tube 71 on each side of the interconnection. A flexible and extensible jumper hose 72 for the oil line is utilized having a pair of hexagonal swivel nuts 73 thereon, one at each end, for making connections to the respective coupling tubes 71. This flexible jumper hose 72 may conveniently be in the form of a corrugated metal tube.

When making the connection between the two pressure hoses 24, the first step is to bring the hose couplings 42 fairly close together with a coupling spud 76 between them. The flexible jumper hose 72 is passed through the coupling spud 76 and is connected at each end to the respective coupling tubes 71. Then the joints 41 are brought together and the two swivel nuts 48 are tightened up to complete the interconnection.

In the interconnection between lengths of pressure hose as shown in FIGURES 1 and 5A, the lengths of the oil line hose 29 are joined by means of a short length of rigid tubing 78 which is inserted into the ends of these oil hoses and held by the clamps 58. Also, a male and female type coupling may be used for the oil line hose to make connection at 78, or a single longer length of oil line hose 29 may be used extending over the coupling for the pressure hose 24.

The term "hose coupling" is intended to include apparatus for making a connection from a hose to the hammer equipment or other equipment supplied by the hose as well as being intended to include apparatus for making an interconnection between two hoses.

The term "detachable coupling" indicates that the coupling may be detached from the equipment or from another hose, but the coupling itself may be permanently secured to the end of the hose with which it is associated or may be removable therefrom for reuse on other hoses, as shown in these examples. It will be appreciated that the lubrication system of this invention can also be embodied in such hose couplings which are permanently secured to the end of a hose. The lubrication system of this invention can be used to good advantage with even larger or smaller pressure hose than those described in the foregoing examples.

From the foregoing it will be understood that the embodiments of the lubrication system of the present invention described above are well suited to provide the advantages set forth, and since many possible embodiments may be made of the various features of this invention and as the apparatus herein described may be varied in various parts, all without departing from the scope of the invention, it is to be understood that all matter hereinbefore set forth or shown in the accompanying drawings is to be interpreted as illustrative and not in a limiting sense and that in certain instances, some of the features of the invention may be used without a corresponding use of other features, all without departing from the scope of the invention.

I claim:

1. An efficient system for supplying pressure fluid through a pressure hose and for supplying lubricating oil to a pile driving hammer and the like apparatus having an intake port and being operated by the pressure fluid fed into said port, said system protecting the lining of the pressure hose from the lubricating oil while assuring a proper supply of lubrication within the hammer apparatus and comprising a source of pressure fluid, a flexible pressure hose extending from said source to an end near the hammer apparatus, a detachable hose coupling fastened to the end of said pressure hose and detachably secured to said hammer at said intake port for feeding the pressure fluid thereto, a source of lubricating oil located near said source of pressure fluid, a flexible small diameter oil line hose secured to the outside of said pressure hose and extending therealong to the end near said hammer apparatus, anchoring means securing said oil line hose to said detachable hose coupling at the hammer apparatus, said detachable hose coupling having a hollow stem fitting within the end of the hose, a hose clamp embracing the end of the hose for clamping the hose about said stem, said stem having an end projecting from said hose with a flange thereon and a swivel nut engaging said flange for making connection to the hammer, the side wall of said stem including an oil injector passageway entering its interior at a point located between the end of the hose and said flange and passing through the side wall, the end of said oil line hose adjacent to the detachable coupling being connected to said oil injector passageway for injecting oil into the passageway, oil discharge means at the inner end of said injector passageway within the bore of said hollow stem and directed into the hammer apparatus in the path of flow of the pressure fluid into the hammer apparatus for blowing the lubricating oil into the intake port along with the pressure fluid, thereby assuring proper lubrication of the hammer apparatus.

2. In a lubrication system for pressure-operated hose-fed pile driving hammers and similar hammer apparatus, the improvement for providing efficient lubrication comprising a pressure hose for feeding pressure fluid to the hammer apparatus for its operation, a detachable hose coupling secured to the end of the pressure hose and including a coupling stem inserted within the end of the pressure hose and having an end portion projecting therefrom a hose clamp surrounding the end of the hose around said coupling stem, said projecting end portion having a shoulder with a swivel nut thereon for releasably attaching said end portion to the hammer apparatus for feeding pressure fluid from the hose through the bore of said coupling stem to the hammer apparatus, a small diameter flexible oil line hose extending along the outside of the pressure hose to said coupling, an anchoring member securing said oil line hose to the hose clamp, said end portion of the coupling stem having an oil injector passageway passing transversely therethrough from the exterior of said coupling stem to its interior, said oil injector passageway being located between the end of said hose and said shoulder, said oil line hose being connected to said oil injector passageway for feeding the lubricating oil therethrough, and an oil injector nozzle at the inner end of said injector passageway within the bore of said coupling stem and aimed in the direction of flow of the pressure fluid in the path of flow of the pressure fluid into the hammer apparatus for propelling oil along with the stream of pressure fluid which passes in the direction from the pressure hose into and through said coupling stem.

3. A detachable coupling for pressure hose of the type for conveying steam and compressed air to pile hammers and similar pressure-operated apparatus comprising a first length of pressure hose having first coupling means secured thereto, a second length of pressure hose having second coupling means secured thereto, fastening means for securing said first and second coupling means together, each of said coupling means having a transverse passageway therein from its exterior to its interior, and a flexible, extensible hose of substantially smaller diameter than said pressure hose extending through said fastening means and being releasably secured to said coupling means at the inner ends of said transverse passageways for conveying lubricating oil therebetween.

4. A detachable coupling for pressure hose of the type for conveying steam and compressed air to pile hammers and similar pressure-operated apparatus and for providing lubrication to the hammer apparatus, said detachable coupling including a coupling stem having first and second end portions with a generally tubular wall extending therebetween, the first end portion of the coupling stem being adapted to fit into the end of the pressure hose, the second end portion being adapted to project from the end of the pressure hose for making a pressure-tight connection, the wall of the coupling stem having a thickened portion intermediate its ends with a transverse passageway therethrough for feeding lubricating oil therethrough, and said coupling stem having a lug thereon intermediate its ends for connection to a hose clamp, said thickened portion of the wall of the coupling stem including an external projection integral with said lug, said transverse passageway passing through said external projection.

5. In a lubrication system for pressure-operated hose-fed pile driving hammers and similar hammer apparatus, the improvement for providing efficient lubrication comprising a pressure hose for feeding pressure fluid to the hammer apparatus for its operation, a detachable hose coupling secured to the end of the pressure hose and including a coupling stem inserted within the end of the pressure hose and having an end portion projecting therefrom, a hose clamp surrounding the end of the hose around said coupling stem, said projecting end portion having a shoulder with a screw threaded element thereon for releasably attaching said end portion to the hammer apparatus for feeding pressure fluid from the hose through the bore of said coupling stem to the hammer apparatus, a small diameter flexible oil line hose extending along the outside of the pressure hose to said coupling, an anchoring member securing said oil line hose to the hose clamp, said end portion of the coupling stem having an oil injector passageway passing transversely therethrough from the exterior of said coupling stem to its interior, said oil injector passageway being located between the end of said hose and said shoulder, said oil line hose being connected to said oil injector passageway for feeding the lubricating oil therethrough and an oil injector nozzle at the inner end of said injector passageway within the bore of said coupling stem and aimed in the direction of flow of the pressure fluid in the path of flow of the pressure fluid into the hammer apparatus for propelling oil along with the stream of pressure fluid which passes in the direction from the pressure hose into and through said coupling stem.

References Cited in the file of this patent
UNITED STATES PATENTS

| | | |
|---|---|---|
| 510,198 | Shaw | Dec. 5, 1893 |
| 951,234 | Cannon | Mar. 8, 1910 |
| 1,066,214 | Mulconroy et al. | July 1, 1913 |
| 1,197,873 | Tremain | Sept. 12, 1916 |
| 1,209,869 | Murphy | Dec. 26, 1916 |
| 1,824,540 | Gronkwist | Sept. 22, 1931 |
| 2,214,242 | Blocker | Sept. 10, 1940 |
| 2,445,249 | Sproull | July 13, 1948 |
| 2,879,864 | Kupka | Mar. 31, 1959 |